(12) United States Patent
Isaji et al.

(10) Patent No.: US 7,234,441 B2
(45) Date of Patent: Jun. 26, 2007

(54) SPARK PLUG SYSTEM IN AN INTERNAL COMBUSTION ENGINE

(75) Inventors: Hiroshi Isaji, Kanagawa (JP); Shunichi Mitsuishi, Kanagawa (JP); Kouichi Mori, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 11/373,942

(22) Filed: Mar. 13, 2006

(65) Prior Publication Data

US 2006/0201480 A1    Sep. 14, 2006

(30) Foreign Application Priority Data

Mar. 14, 2005  (JP) ............................. 2005-070595

(51) Int. Cl.
*F02P 15/02*    (2006.01)
(52) U.S. Cl. ...................................... 123/309; 123/310
(58) Field of Classification Search ................ 123/309, 123/310, 638
See application file for complete search history.

(56) References Cited

U.S. PATENT DOCUMENTS

| | | | |
|---|---|---|---|
| 2,025,203 A | 12/1935 | Harper, Jr. | |
| 2,191,746 A * | 2/1940 | Barkeij | 123/310 |
| 2,324,705 A | 7/1943 | Huber | |
| 2,522,921 A * | 9/1950 | Barkeij | 123/309 |
| 3,809,042 A | 5/1974 | Hosho et al. | |
| 4,768,487 A | 9/1988 | Yamamoto et al. | |
| 5,269,270 A * | 12/1993 | Suzuki et al. | 123/310 |
| 5,305,720 A | 4/1994 | Ando et al. | |
| 5,327,864 A * | 7/1994 | Regueiro | 123/310 |
| 5,408,968 A * | 4/1995 | Yamamoto et al. | 123/309 |
| 5,465,695 A | 11/1995 | Yamamoto et al. | |
| 6,499,456 B1 * | 12/2002 | Nogi et al. | 123/310 |
| 6,705,275 B2 | 3/2004 | Fukuzumi | |
| 6,748,917 B1 * | 6/2004 | Hoffmann et al. | 123/310 |
| 2003/0196636 A1 * | 10/2003 | Ashida et al. | 123/310 |

FOREIGN PATENT DOCUMENTS

| | | |
|---|---|---|
| GB | 1536747 | 5/1976 |
| JP | 08004641 | 1/1996 |

\* cited by examiner

*Primary Examiner*—T. M. Argenbright
(74) *Attorney, Agent, or Firm*—Rader, Fishman & Grauer PLLC

(57) ABSTRACT

A spark plug system includes a center spark plug and a plurality of peripheral spark plugs, the spark plugs extending into a ridge-roof type combustion chamber of an internal combustion engine from the inner surface of a cylinder head and being disposed approximately on the ridgeline of the ridge-roof. The amount by which the center plug projects into the combustion chamber from the inner surface of the cylinder head is different from the amount by which each of the peripheral plugs projects into the combustion chamber from the inner surface of the cylinder head, whereby the time in which the flame propagation of the center plug reaches the flame propagation of the peripheral plugs is delayed.

12 Claims, 4 Drawing Sheets

SPARK PLUG SYSTEM IN AN INTERNAL COMBUSTION ENGINE

RELATED APPLICATION

The disclosure of Japanese Patent Application No. 2005-070595, filed Mar. 14, 2005, including its specification, claims and drawings, is incorporated herein by reference in its entirety.

FIELD

Described herein is a spark plug system for an internal combustion engine having multi-point ignition in each cylinder thereof.

BACKGROUND

The multi-point ignition engine disclosed in Japanese Laid-open Application No. H08-4641 provides combustion stability by arranging peripheral ignition or spark plugs at locations where the air flow is slight so that the spark of each plug is not easily extinguished, thereby improving the ignition rate. The present system provides an improved arrangement of spark plugs in an internal combustion engine.

SUMMARY

The present spark plug system includes a center spark plug and a plurality of peripheral spark plugs. The spark plugs extend into a ridge-roof type combustion chamber of an internal combustion engine from the inner surface of a cylinder head and are disposed approximately on the ridgeline of the ridge-roof. The amount by which the center plug projects into the combustion chamber from the inner surface of the cylinder head is different from the amount by which each of the peripheral plugs projects into the combustion chamber from the inner surface of the cylinder head. With this arrangement, the time in which the flame propagation of the center plug reaches the flame propagation of the peripheral plugs is delayed.

BRIEF DESCRIPTION OF THE DRAWINGS

Other features and advantages of the present system will be apparent from the ensuing description, taken in conjunction with the accompanying drawings, in which.

DETAILED DESCRIPTION OF THE ILLUSTRATED EMBODIMENTS

Figure 1A:
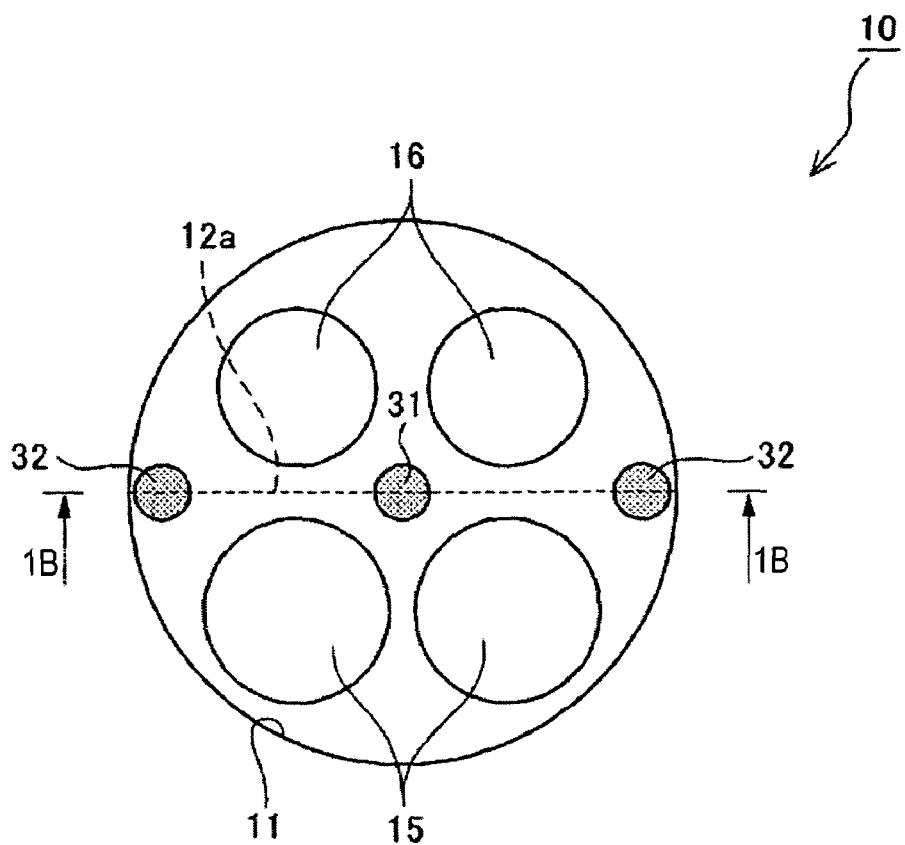
FIG. 1A is a schematic plan view of a first embodiment of the present spark plug system in a multi-point ignition combustion engine.
Figure 1B:
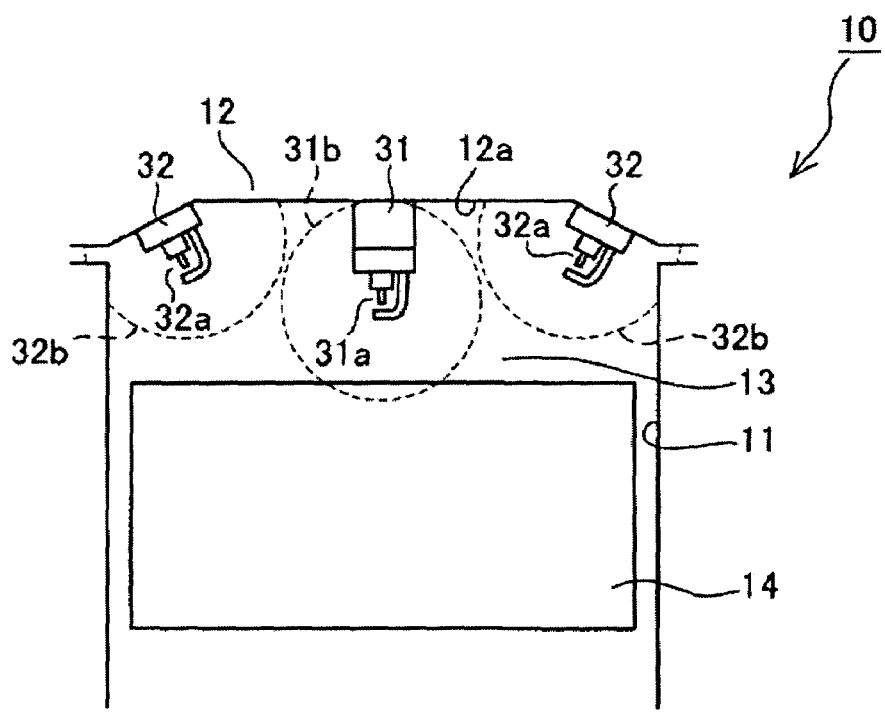
FIG. 1B is a schematic sectional view of the first embodiment in elevation, taken along line 1B-1B of FIG. 1A.

Referring to FIGS. 1A and 1B, in an internal combustion engine 10 a combustion chamber 13 is formed by a cylinder bore 11 provided in a cylinder block, a cylinder head 12 and a piston 14. The combustion chamber 13 is of the ridge-roof type. An inlet valve 15 is disposed on one side of the ridge-roof ridgeline 12a, and an exhaust valve 16 is disposed on the other side. A center spark plug 31 and peripheral spark plugs 32 are disposed along the ridgeline 12a. The center spark plug 31 and the peripheral spark plugs 32 have electrodes 31a and 32a including a positive electrode and a negative electrode.

The center plug 31 is disposed at the approximate center of the cylinder head 12. Center plug 31 projects from the inner surface of the cylinder head 12 so that an electrode 31a thereof is close to the piston 14.

The peripheral plugs 32 are disposed in proximity to the ridge-roof ridgeline 12a, and close to the periphery of the combustion chamber 13. The amount of projection of the electrodes 32a of the peripheral plugs is adjusted so that they are closer to the inner surface of the cylinder head 12 than the center plug electrode 31a. Therefore, gaps between the positive electrode and the negative electrode of the plugs are disposed at varying positions in the axial direction of the cylinder.

The positions of the center plug 31 and peripheral plugs 32 are determined as follows. The center plug 31 generates sparks from the electrode 31a to propagate the flame. The propagation is shown as dotted circle 31b. The peripheral plugs 32 also generate sparks from the electrodes 32a to propagate the flame. These propagations are shown as dotted arcs 32b. When the center plug 31 and peripheral plugs are activated with equivalent ignition energy, the radii of the flame propagation circle 31a and arcs 32b are approximately equal. The vertical positions of the center plug 31 and peripheral plugs 32 are disposed so that overlapping of the flame propagation circle 31a and arcs 32b is delayed (in other words, interference between propagation by each of the flames is delayed). The details of the positions are determined by preliminary testing, etc.

In the first embodiment, since the center plug 31 and peripheral plugs 32 are disposed approximately along the ridge-roof ridge line 12a, and the amount of projection of the center plug 31 from the inner surface of the cylinder head 12 is greater than that of the peripheral plugs so that gaps between the positive electrode and the negative electrode of the plugs are disposed at varying positions in the axial direction of the cylinder, when the central plug 31 and peripheral plugs 32 are simultaneously ignited, their flame propagations do not readily interfere with each other and are developed in a stable manner. This allows stable combustion so that emissions can be significantly reduced, thereby improving fuel consumption.

Regarding each of the second, third and fourth embodiments of the present ignition system, as described below, those elements having the same function as elements of the first embodiment are indicated in the respective drawing figures by the same reference characters, and redundant description is omitted.

Figure 2A:
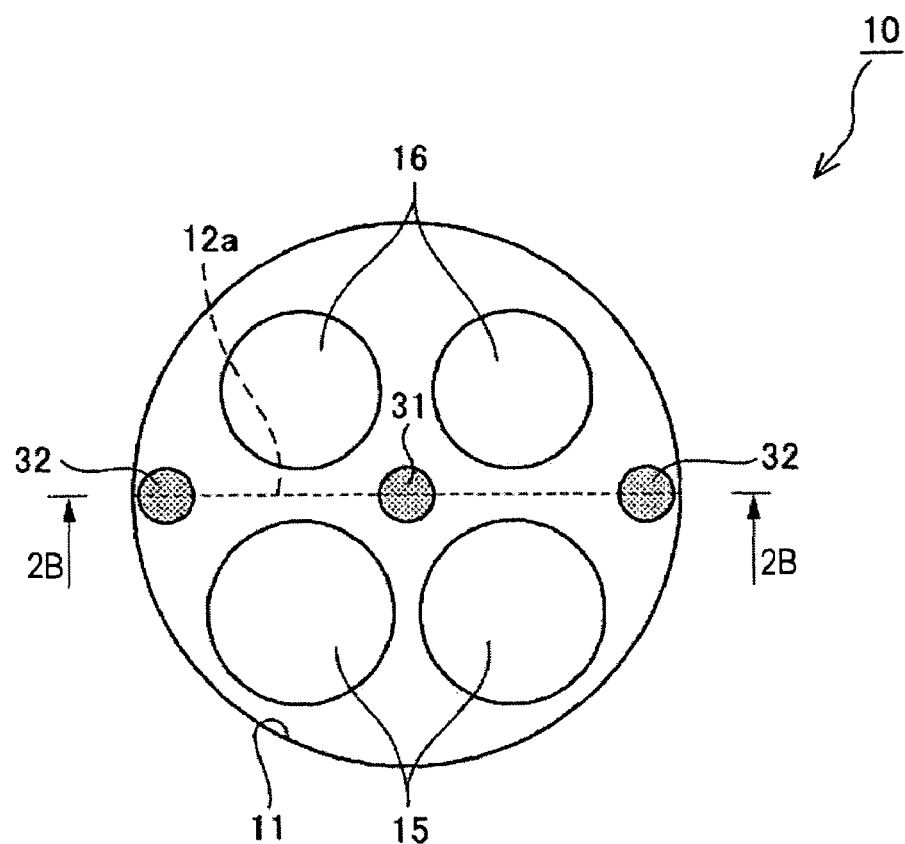
FIG. 2A is a schematic plan view of a second embodiment of the present spark plug system in a multi-point ignition combustion engine.
Figure 2B:
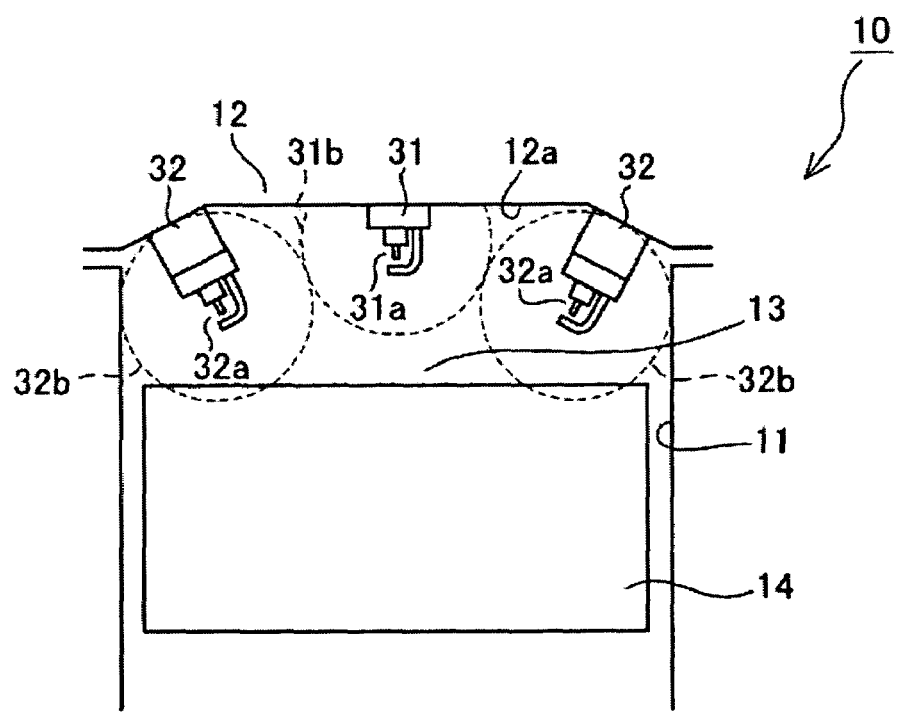
FIG. 2B is a schematic sectional view of the second embodiment in elevation, taken along line 2B-2B of FIG. 2A.

Referring to FIGS. 2A and 2B, the multi-point ignition engine 10 according to the second embodiment is different from that according to the first embodiment in that the amount of projection of each of the peripheral plugs 32 from the inner surface of the cylinder head 12 is greater than that of the center plug 31.

According to the second embodiment as well, stable development of the flames is achieved because their respective propagations do not readily interfere with each other when the center plug 31 and peripheral plugs 32 are ignited simultaneously, and consequently, stable combustion is possible, reducing emissions significantly, and therefore improving fuel consumption.

Figure 3A:
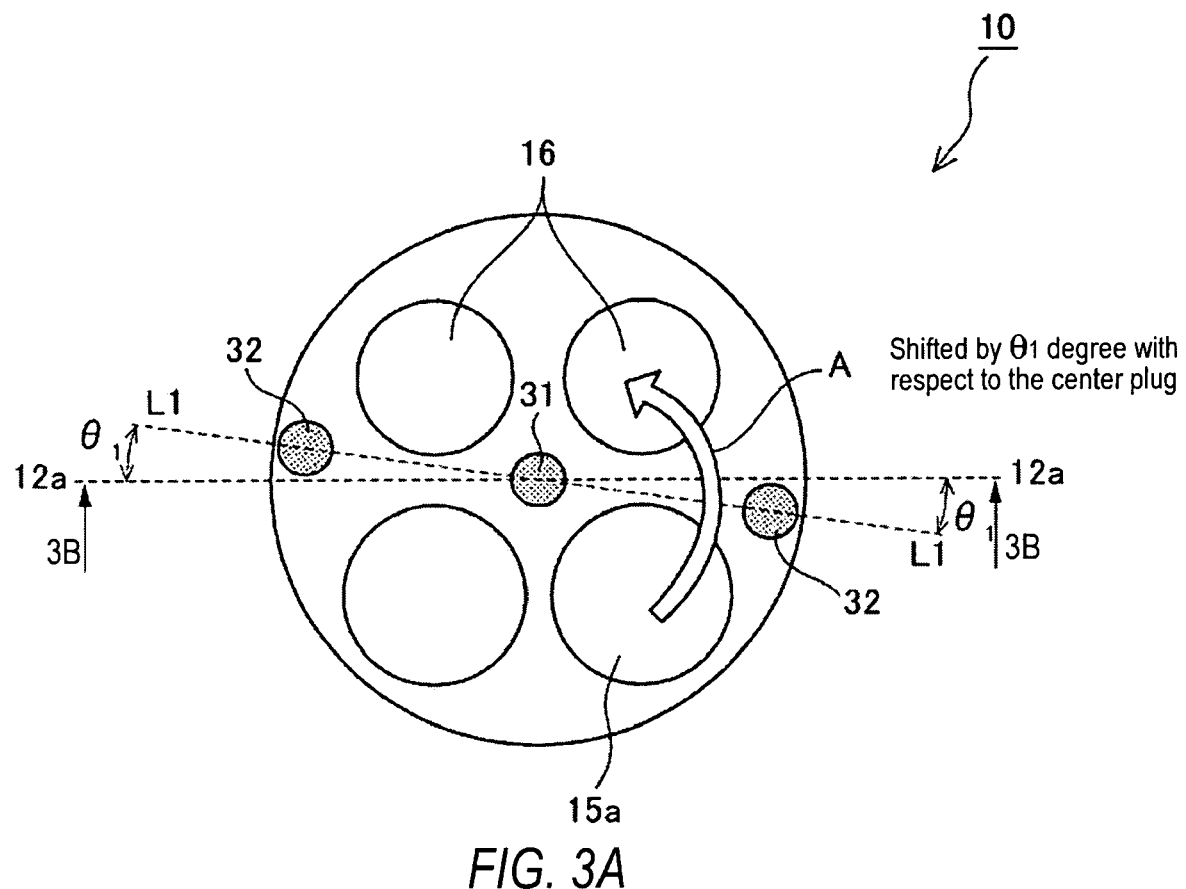
FIG. 3A is a schematic plan view of a third embodiment of the present spark plug system in a multi-point ignition combustion engine.
Figure 3B:
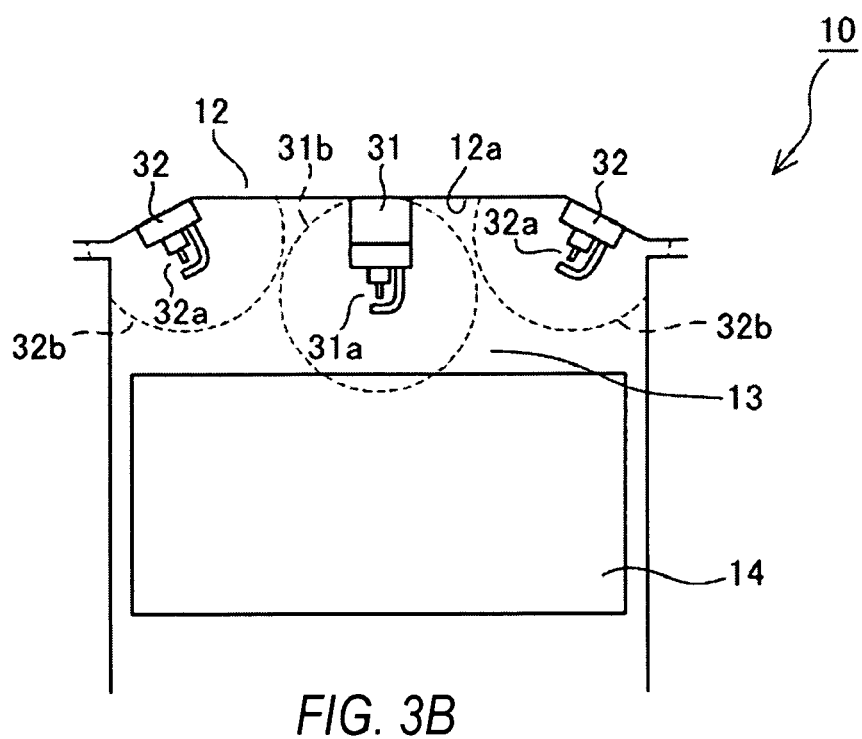
FIG. 3B is a schematic sectional view of the third embodiment in elevation, taken along line 3B-3B of FIG. 3A.

Referring to FIGS. 3A and 3B, one of the inlet valves 15a of the multi-point ignition engine 10 according to the third embodiment is a swirl-making port, and it creates a swirl flow, represented by arrow A in FIG. 3A, depending on operating conditions. U.S. Pat. No. 4,768,487 which is hereby incorporated by reference discloses a swirl generating means. The peripheral plugs 32 are disposed on a straight line L1,L1, on the upstream side of the swirl flow, rotated through a predetermined angle θ1 around the center plug 31 relative to the ridgeline 12a of the ridge-roof-type combustion chamber 13.

The peripheral plugs 32 are disposed upstream of the swirl flow so that they can be ignited while the swirl flow is strong, and consequently, unburned gas can be combusted in an even more preferable manner.

Figure 4A:
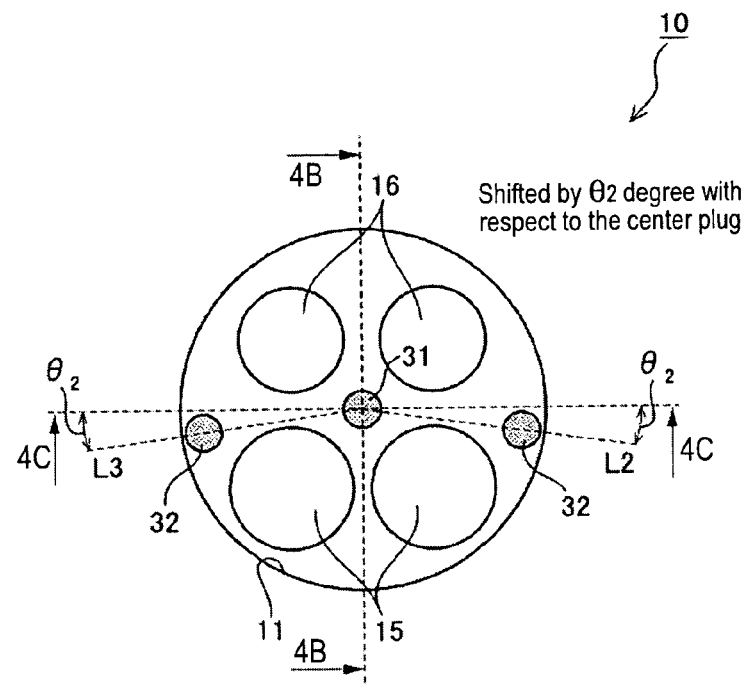
FIG. 4A is a schematic plan view of a fourth embodiment of the present spark plug system in a multi-point ignition combustion engine.
Figures 4B, 4C:
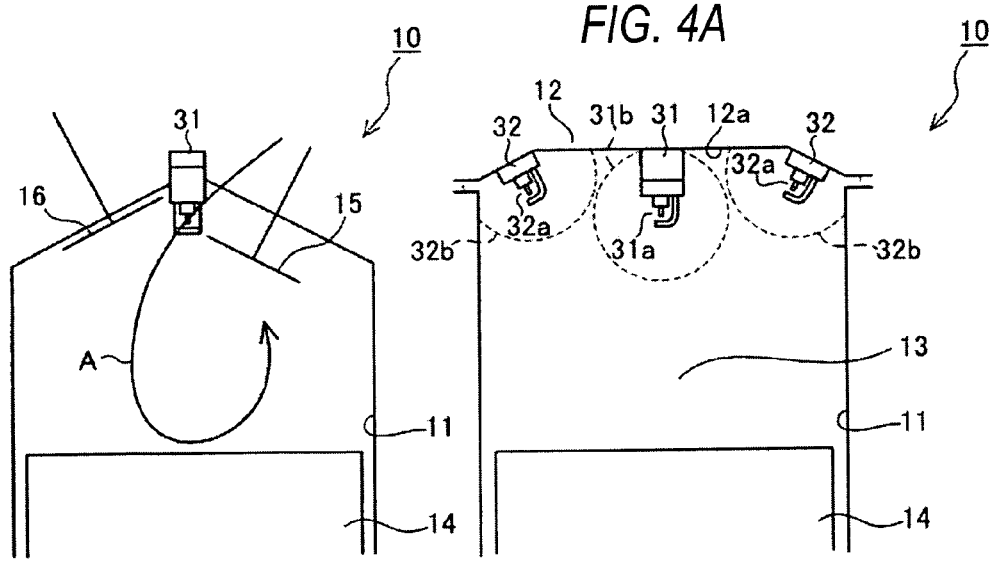
FIG. 4B is a schematic sectional view of the fourth embodiment in elevation, taken along line 4B-4B of FIG. 4A.
FIG. 4C is a schematic sectional view of the fourth embodiment in elevation, taken along the line 4C-4C of FIG. 4A.

Referring to FIGS. 4A, 4B and 4C, according to the fourth embodiment of the present system the inlet port of the inlet valve 15 is a tumble generation port, and generates a tumble flow, represented by arrow A in FIG. 4(B), depending on operating conditions. A description of a normal direction tumble flow is provided as follows: It is the normal direction tumble flow in which the air entering the cylinder from the inlet valve 15 passes down along the cylinder wall on the side near the exhaust valve 16 and passes up along the cylinder wall on the side near the inlet valve 15. In contrast, it is a reverse direction tumble flow in which the air entering the cylinder from the inlet valve 15 passes down along the cylinder wall on the side near the inlet valve 15 and passes up along the cylinder wall on the side near the exhaust valve 16 in the reverse direction opposite to the normal direction tumble flow. U.S. Pat. No. 6,705,275 and U.S. Pat. No. 5,305,720 which are hereby incorporated by reference disclose a normal tumble generating device and a reverse tumble generating device respectively.

The peripheral plugs 32 are disposed on the straight lines L2 and L3 on the upstream side of the tumble flow, which are rotated in upstream side of the tumble flow in a vicinity of a ceiling of the combustion chamber through a designated angle θ2 around the center plug 31 relative to the ridge-roof ridgeline 12a of the ridge-roof-type combustion chamber 13, so that they are relatively close to each of inlet valves 15.

As described above, the peripheral plugs 32 are disposed upstream of the tumble flow so that they can be ignited while the tumble flow is strong, and consequently, the unburned gas can be combusted in an even more preferable manner.

A variety of modifications and changes are possible without being limited to the above-described embodiments. For example, in the third and fourth embodiments the amount of projection of the peripheral plugs 32 from the inner surface of the cylinder head may be greater than that of the center plug 31, as in the second embodiment.

It will also be recognized that an internal combustion engine may have a plurality of cylinder bores disposed in a row, each of the combustion chambers thereof being formed with a ridge-roof. In such an engine it is preferable that the ridge of each of the ridge-roofs be aligned with the direction of the row of cylinder bores, the spark plugs in each of the combustion chambers being substantially disposed along the ridge of the respective ridge-roof in plan view.

Thus, while the present ignition system has been described in connection with certain specific embodiments thereof, this is by way of illustration and not of limitation, and the appended claims should be construed as broadly as the prior art will permit.

What is claimed is:

1. A spark plug system for an internal combustion engine having a cylinder head with an inner surface defining a part of a pent roof type combustion chamber, the spark plug system comprising:
   a center spark plug disposed at an approximate center of a combustion chamber; and
   a plurality of peripheral spark plugs disposed at a periphery of the combustion chamber approximately on a ridgeline of the combustion chamber,
   wherein a projection amount of the center spark plug from an inner surface of the cylinder head is different from a projection amount of the peripheral spark plugs, whereby a time in which a flame propagation by the center spark plug reaches a flame propagation by the peripheral spark plugs is delayed.

2. A spark plug system according to claim 1 wherein the projection amount of the center spark plug is greater than that of the peripheral spark plugs.

3. A spark plug system according to claim 1, wherein the projection amount of the center spark plug is smaller than that of the peripheral spark plugs.

4. A spark plug system according to claim 1 wherein the peripheral spark plugs are disposed in proximity to the ridgeline of the combustion chamber, and are disposed on an upstream side of a gas flow in the combustion chamber relative to the ricigeline in a plan view.

5. A spark plug system according to claim 2 wherein the peripheral spark plugs are disposed in proximity to the ridgeline of the combustion chamber, and are disposed on an upstream side of a gas flow in the combustion chamber relative to the ridgeline in a plan view.

6. A spark plug system according to claim 3 wherein the peripheral spark plugs are disposed in proximity to the ridgeline of the combustion chamber, and are disposed on an upstream side of a gas flow in the combustion chamber relative to the ridgeline in a plan view.

7. A spark plug system according to claim 4 wherein the gas flow is a swirl flow and each of the peripheral plugs are disposed on opposite sides of the ridgeline and upstream of the gas flow in the combustion chamber.

8. A spark plug system according to claim 4, wherein the gas flow in the combustion chamber is a rumble flow and the peripheral spark plugs are disposed at locations that are closer to a gas inlet valve relative to the ridgeline of the combustion chamber.

9. A spark plug system according to claim 4 wherein the gas flow in the combustion chamber is a reverse tumble flow and the peripheral plugs are disposed at locations that are closer to an exhaust valve relative to the ridgeline of the combustion chamber.

10. An internal combustion engine comprising:
a cylinder block having a cylinder bore formed therein,
a piston movably disposed in the cylinder;
a cylinder head mounted on the cylinder block, the cylinder bead having an inner surface defining a portion of a combustion chamber between the cylinder bore and the piston; the combustion chamber includes a ridgeline having opposite end portions that are positioned at approximately the same distance along a cylinder axis; and
a plurality of spark plugs extending from the inner surface of the cylinder head into the combustion chamber, wherein the plurality of spark plugs includes a center spark plug disposed approximately in the center of the combustion chamber on the ridgeline in a plan view, and a pair of side spark plugs disposed substantially in the vicinity of the wall of the cylinder and are displaced from the center of the combustion chamber in plan view so as to be respectively disposed on the opposite end portions of the ridgeline;
wherein each of the spark plugs has a gap between a positive electrode and a negative electrode, wherein the gaps of the spark plugs are positioned at varying distances along a cylinder axis.

11. The internal combustion engine according to claim 10, comprising a plurality of said cylinder bores disposed in a row, wherein each of the combustion chambers thereof is formed with a ridge-roof, the ridge thereof being aligned with the direction of the row of cylinder bores, and wherein the plugs in each of the combustion chambers are disposed along the ridge of the respective ridge-roof in plan view.

12. The internal combustion engine according to claim 10, wherein the distances between the inner surface of the cylinder head and the gaps are differentiated, whereby the gaps are positioned at varying distances along a cylinder axis.

* * * * *